United States Patent Office 3,478,013
Patented Nov. 11, 1969

3,478,013
CARBOHYDRATE DERIVATIVES OF
ERYTHROMYCIN
Peter H. Jones, Lake Forest, Ill., and Elizabeth A. Rowley, Green Lake, Wis., assignors to Abbott Laboratories, North Chicago, Ill., a corporation of Illinois
No Drawing. Filed Aug. 22, 1966, Ser. No. 573,849
Int. Cl. C07c 47/18; C07d 7/04; A61k 21/00
U.S. Cl. 260—210
14 Claims

ABSTRACT OF THE DISCLOSURE

The invention encompasses carbohydrate derivatives of acidic esters of erythromycin such as the oxalate, malonate, succinate, glutarate, adipate, phthalate, maleate, or fumarate, or any ester which has a free acidic group to which may be bonded a carbohydrate moiety; the carbohydrate including monosaccharides such as glucose or fructose; disaccharides such as maltose, lactose, or sucrose; or any of the oligosaccharides. These derivatives are biologically active against bacteria normally sensitive to erythromycin.

---

The present invention relates generally to novel derivatives of erythromycin and more specifically to carbohydrate derivatives of acidic esters of erythromycin.

Generally, the present invention involves the carbohydrate derivatives of acidic esters of erythromycin such as the oxalate, malonate, succinate, glutarate, adipate, phthalate, maleate, or fumarate, or any ester which has a free acidic group to which may be bonded a carbohydrate moiety. The carbohydrates referred to herein may be monosaccharides such as glucose or fructose; disaccharides such as maltose, lactose, or sucrose; or any of the oligosaccharides.

The above derivatives are biologically active against bacteria normally sensitive to erythromycin. They are non-toxic and, in comparison to previously-known derivatives of erythromycin, are very water soluble. Erythromycin itself, for example, has a solubility of about 0.2% whereas some of the compounds of the present invention have a solubility up to 10%. These properties make the compounds ideally suitable for intramuscular administration by means of a hypodermic needle and the like.

The novel compounds of the present invention can be represented by the following formula:

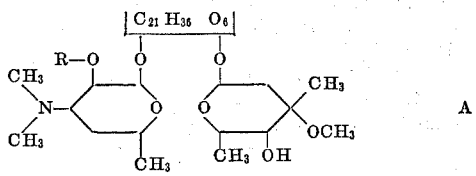

in which R may be, for example, D-glucopyranose hydrogen phosphate, loweralkyl-α-D-glucopyranoside hydrogen phosphate, 2-amino-2-deoxy-D-glucopyranose hydrogen phosphate, sucrose hydrogen phosphate, sucrose erythromycin-2′-hydrogen phosphate, sucrose [di-(erythromycin-2′-hydrogen phosphate)], β-lactose hydrogen phosphate, β-lactose-(erythromycin-2′-hydrogen phosphate), D-glucopyranose phosphite, loweralkyl-α-D-glucopyranoside phosphite, D-glucopyranose β-sulfopropionate, and loweralkyl-α-D-glucopyranoside β-sulfopropionate. In the foregoing description, the term "loweralkyl" includes alkyl radicals containing from 1 to 4 carbon atoms. For convenience, the erythromycin molecule has been simplified in comparison to the complete formula as set forth in J. Am. Chem. Soc., 77, 3677 (1955); 78, 388, 808 (1956).

For further convenience, the compounds of the present invention will be specifically described and exemplified as carbohydrate derivatives of the dihydrogen phosphate, hydrogen phosphite, and sulfopropionate ester derivatives of erythromycin, although other acidic esters such as those previously enumerated may likewise be employed. These acidic esters are the starting materials for making the compounds of this invention and are used to link the erythromycin and carbohydrate molecules. They may be depicted as follows:

Phosphate:

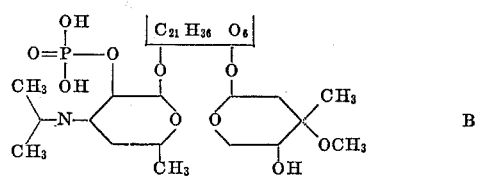

B

Phosphite:

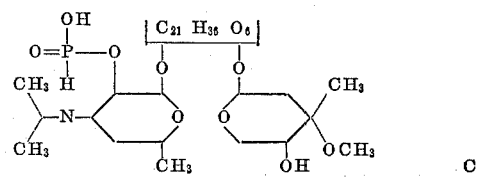

C

Sulfopropionate:

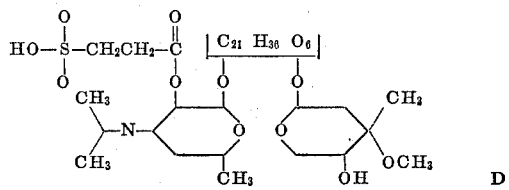

D

In general, the novel compounds of the present invention are prepared by first forming the corresponding phosphoric or phosphorus acid salt of the amino group of erythromycin and treatment of the resultant product with dicyclohexylcarbodiimide to produce the phosphoryl (phosphate) or phosphonyl (phosphite) acidic ester derivatives of erythromycin. The preparation of these starting materials will be more fully described hereinafter. The preparation is also described in copending application Ser. No. 543,046, filed Apr. 18, 1966, now Patent No. 3,361,738. The preparation of the sulfopropionate starting material is described in Patent 2,969,352, issued Jan. 24, 1961.

The carbohydrate derivatives of phosphate erythromycin esters can then be prepared as follows. To a mixture of from equimolar portions to a molar ratio of 3:1 of erythromycin A-2′-(dihydrogen phosphate) (Formula B) and an appropriate carbohydrate is added a solution of dicyclohexylcarbodiimide (from two to four times the concentration of the reactants) in 200 ml. of dry pyridine. The variations in ratios of reactants arise primarily with the lactose and sucrose derivatives wherein it is possible to affix an acidic ester of erythromycin molecule at from one to three positions on the particular sugar molecule. The combined solution is stirred at room temperature for about five days and the precipitated dicyclohexylurea is filtered from the solution. The filtrate is then evaporated to a viscous oil which is redissolved in a minimum of acetone. The acetone solution is in turn filtered and evaporated to a glass. The dried glass is dissolved in 25 ml. of methanol and then filtered, the filtrate being added slowly to 500 ml. of stirred ether. The resultant precipitate is filtered, dissolved in methanol, and again precipitated in one liter of stirring ether. The final precipitate is then filtered and dried.

To prepare the carbohydrate derivatives of phosphite erythromycin esters, the foregoing general procedure is followed, substituting erythromycin A - 2' - (dihydrogen phosphate) (Formula B). Again, to prepare the sulfopropionate erythromycin derivatives, the same procedure is followed substituting 2'-sulfopropionylerythromycin A (Formula D) for erythromycin A - 2' - (hydrogen phosphite) (Formula C) or erythromycin A-2'-(dihydrogen phosphate) (Formula B). Other carbohydrate derivatives may likewise be prepared by substituting the appropriate acidic ester derivative of erythromycin in the foregoing procedure.

The following specific examples are for the purpose of illustrating the preferred form of the present invention and are not intended to limit the invention to the precise proportions or reactants used therewith or products produced thereby. For convenience hereinafter, the erythromycin molecule will be referred to as "ERY", the substitution being at the 2'-position.

EXAMPLE 1

Erythromycin A-2'(dihydrogen phosphate)

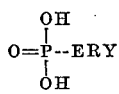

To a solution of 39.0 g. (0.15 mole) of dibenzyl phosphite, prepared by the method found in J. Am. Chem. Soc., 76, 916 (1954), in 500 ml. dry benzene was added, in three portions, 21.0 g. (0.16 mole) of N-chlorosuccinimide with vigorous stirring. The temperature was held under 35° as the solution was stirred for two hours.

The succinimide was removed by filtration. The benzene was removed under reduced pressure at 30°, after which the solution was pumped at high vacuum for 45 minutes. 500 ml. of ether was added, and the additional precipitate was removed. The ethereal solution of dibenzylphosphochloridate was added over a one-hour period to a solution of 73 g. (0.10 mole) of erythromycin A, 140 ml. of triethylamine, and 1500 ml. of ether, with the mixture being stirred for 3½ hours. The sticky precipitate of triethylamine hydrochloride was removed and the solution kept at 4° overnight. The solution was then evaporated under reduced pressure to a glass, triturated with dry ether, filtered, and washed with fresh ether. The resultant amorphous solid product was crystallized from an acetone-water mixture.

A solution of 40 g. of erythromycin A-2'-(dibenzyl phosphate), prepared as previously described, in ethanol was hydrogenated over a palladium-on-carbon catalyst with a theoretical uptake of hydrogen. The catalyst was removed by filtration and the solution was then evaporated under reduced pressure at 35° to a glass. The resultant dry material was first triturated with Skelly B solvent, then ether. The yield was 36.5 g. (99%) as the triethylamine salt. This salt crystallized from methanol-water to form the zwitterion.

$[\alpha]_D^{25} = -59.8°$ (MeOH, C=1.5)

Calc. for: $C_{37}H_{68}NO_{16}P$: 3.81; N, 1.72. Found: P, 3.52; N, 1.92.

EXAMPLE 2

Erythromycin A-2'-(hydrogen phosphite) (starting material)

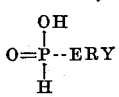

Ammonium monobenzyl phosphite [0.95 g. (.005 mole)], prepared by the method of Baddily et al., J. Chem. Soc., 815 (1949), was dissolved in 8 ml. water and acidified with 2.7 ml. 3 N hydrochloric acid. The resultant aqueous solution was extracted twice with 7 ml. of chloroform. The chloroform extracts were combined and dried over sodium sulfate and then evaporated to an oil.

The product, monobenzyl phosphite in 20 ml. dry pyridine, 3.67 g. (.005 mole) of erythromycin A in 20 ml. dry pyridine, and 1.24 g. (.006 mole) of dicyclohexylcarbodiimide in 10 ml. dry pyridine were combined, mixed thoroughly, capped, and allowed to stand at room temperature for four days.

The solution was then filtered to remove the urea and subsequently evaporated at room temperature under reduced pressure. The residue was dissolved in a minimum of acetone and filtered. The filtrate was then diluted with a large excess of ether and the precipitate filtered.

A solution of 2.0 g. of erythromycin A-2'-(benzyl phosphite), prepared as previously described, in ethanol was hydrogenated over palladium on a carbon catalyst. The catalyst was removed by filtration and the solution evaporated at reduced pressure at 35° to a glass.

The dry product was stirred with dry ether for 1½ hours, then filtered and dried.

Yield=1.55 g. (85.7%)

$[\alpha]_D^{23°} = -58.3$ (MeOH, c=1.5)

Solubility, water—5%

Calc. for $C_{37}H_{68}NO_{15}P$: P, 3.88%; N, 1.76%. Found: P, 3.95%; N, 1.82%.

EXAMPLE 3

D-glucopyranose 6-(erythromycin-2'-hydrogen phosphate)

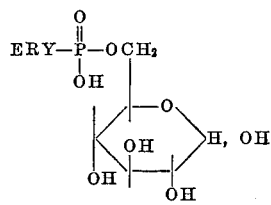

To a mixture of 8.14 g. (0.010 mole) of erythromycin A-2'-(dihydrogen phosphate) prepared by the method of Example 1 and 1.80 g. (0.010 mole) of D-glucopyranose (a 1:1 molar mixture) was added a solution (8.22 g.–0.04 mole) of dicyclohexylcarbodiimide in 200 ml. of dry pyridine. The combined solution was stirred at room temperature for five days and the precipitated dicyclohexylurea was filtered from the solution. The filtrate was then evaporated to a viscous oil and redissolved in a minimum of acetone. The acetone solution was then filtered and evaporated to a glass. The dried glass was dissolved in 25 ml. of methanol, filtered, and the filtrate was then slowly added to 500 ml. of stirred ether. The resultant precipitate was filtered, dissolved in methanol, and again precipitated in one liter of stirring ether. The final precipitate was then filtered and dried.

$[\alpha]_D^{23°} = -34.2$

UV: 260 mμ, ϵ1%=11.28

Bioassay—434 mcg./mg.

Mouse $CD_{50}$:
  IM—15–20 mg./kg.
  Oral—100–150 mg./kg.

Solubility, water—approx. 5%

EXAMPLE 4

Methyl-α-D-glucopyranoside 6-(erythromycin-2'-hydrogen phosphate)

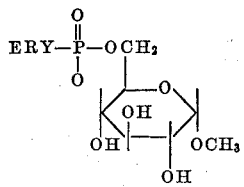

The compound was made with the following amounts of reactants and employing the method of Example 3.

Erythromycin-2'-(dihydrogen phosphate)—8.14 g. (0.01 mole)

α-Methyl glucopyranoside—1.92 g. (0.01 mole)

Molar ratio—1:1

Dicyclohexylcarbodiimide—8.22 g. (0.04 mole)

$[\alpha]_D^{23°} = -20.1$
Bioassay—458 mcg./mg.
Mouse $CD_{50}$:
  IM—5–10 mg./kg.
  Oral—100 mg./kg.
Calc. for $C_{44}H_{80}NO_{21}P$: P, 3.13%; N, 1.41%. Found: P, 2.87%; N, 2.07%.

EXAMPLE 5

β-Lactose-(erythromycin-2'-hydrogen phosphate)

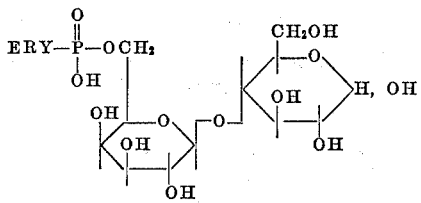

The compound was made following the method of Example 3 and using the noted amounts of reactants. It should be noted that the erythromycin acidic ester moiety may be affixed to either of two positions on the lactose molecule.

Erythromycin-2'-(dihydrogen phosphate)—8.12 g. (0.01 mole)
β-Lactose—3.44 g. (0.01 mole)
Molar ratio—1:1
Dicyclohexylcarbodiimide—8.22 g. (0.04 mole)
$[\alpha]_D^{19°} = -37.9$
Bioassay—471 mcg./mg.
Calc. for $C_{49}H_{88}NO_{26}P$: P, 2.73%; N, 1.41%. Found: P, 2.89%; N, 1.60%
Mouse $CD_{50}$:
  IM—40 mg./kg.
  Oral—100–200 mg./kg.
Solubility, water—approx. 2%

EXAMPLE 6

β-lactose-[bis-(erythromycin-2'-hydrogen phosphate)]

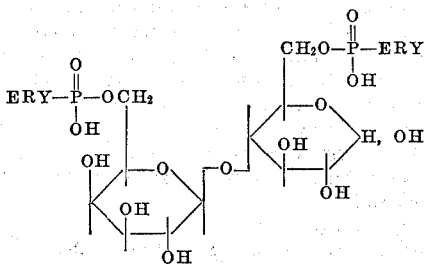

The compound was made following the method of Example 3.

Erythromycin-2'-(dihydrogen phosphate)—8.12 g. (0.01 mole)
β-Lactose—1.72 g. (0.005 mole)
Molar ratio—2:1
Dicyclohexylcarbodiimide—8.22 g. (0.04 mole)
$[\alpha]_D^{19°} = -41.7$
Bioassay—574 mcg./mg.
Mouse $CD_{50}$:
  IM: 40 mg./kg.
  Oral: 100 mg./kg.
Solubility, water: approx. 2%.

EXAMPLE 7

Sucrose-(erythromycin-2'-hydrogen phosphate)

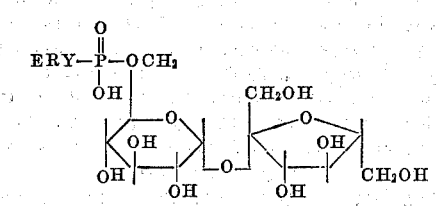

This compound was made following the method of Example 3. It should be noted that the erythromycin acidic ester moiety may be affixed to either of three positions on the sucrose molecule.

Erythromycin-2'-(dihydrogen phosphate)—4.06 g. (0.005 mole)
Sucrose—1.72 g. (0.005 mole)
Molar ratio—1:1
Dicyclohexylcarbodiimide—4.11 g. (0.02 mole)
$[\alpha]_D^{23°} = -12.2$
Bioassay—348 mcg./mg.
Mouse $CD_{50}$:
  IM: >40 mg./kg.
  Oral: 100–200 mg./kg.
Calc. for $C_{49}H_{88}NO_{26}P$: P, 2.73%; N, 1.23%. Found: P, 2.87%; N, 1.36%.
Solubility, water: 2%.

EXAMPLE 8

Sucrose-[tris(erythromycin-2'-hydrogen phosphate)]

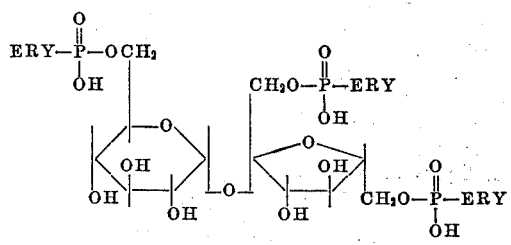

This compound was made following the method of Example 3.

Erythromycin-2'-(dihydrogen phosphate)—6.09 g. (0.0075 mole)
Sucrose—0.86 g. (0.0025 mole)
Molar ratio—3:1
Dicyclohexylcarbodiimide—4.1 g. (0.02 mole)
$[\alpha]_D^{19°} = -39.9$
Bioassay—453 mcg./mg.
Calc. for $C_{123}H_{220}N_3O_{56}P_3$: P, 3.41%; N, 1.54%. Found: P, 3.12%; N, 1.63%.
Mouse $CD_{50}$:
  IM: 20–40 mg./kg.
  Oral: 100 mg./kg.
Solubility, water—1%.

EXAMPLE 9

2-amino-2-deoxy-D-glucopyranose-6-(erythromycin-2'-hydrogen phosphate)

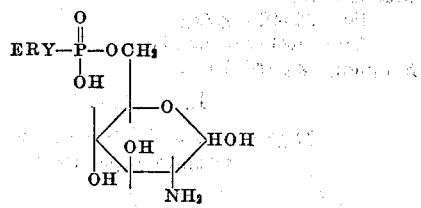

This compound was made following the method of Example 3.

Erythromycin-2'-(dihydrogen phosphate)—8.12 g. (0.010 mole)
D-glucosamine—2.16 g. (0.012 mole)
Ratio—1:1.2
Dicyclohexylcarbodiimide—8.2 g. (0.04 mole)
$[\alpha]_D^{23°} = -44.4$
Bioassay—618 mcg./mg.
Calc. for $C_{43}H_{79}N_2O_{20}P$: P, 3.18%; N, 2.85%. Found: P, 3.55%; N, 2.58%.
Mouse $CD_{50}$:
  IM: >40 mg./kg.
  Oral: 50–100 mg./kg.
Solubility, water—1%.

EXAMPLE 10

D-glucopyranose-6-(erythromycin-2'-phosphite)

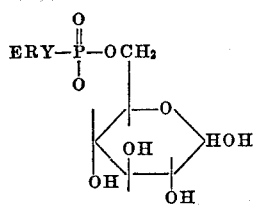

The compound was made following the method of Example 3 but substituting erythromycin A-2'-(dihydrogen phosphite) (Formula C) for the erythromycin A-2'-(dihydrogen phosphate) (Formula B) used in the previous examples.

Erythromycin-2'-(hydrogen phosphite)—3.99 g. (0.005 mole)
D-glucopyranose—0.90 g. (0.005 mole)
Molar ratio—1:1
Dicyclohexylcarbodiimide—4.1 g. (0.02 mole)
$[\alpha]_D^{23°} = -23.7$
Bioassay—350 mcg./mg.
Mouse $CD_{50}$:
  IM: >40 mg./kg.
  Oral: 100–200 mg./kg.
Solubility, water—10%.

EXAMPLE 11

Methyl-α-D-glucopyranoside-6-(erythromycin-2'-phosphite)

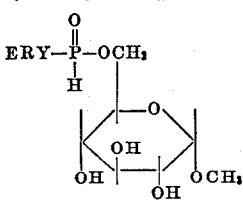

The compound was made following the method of Example 10.

Erythromycin-2'-(hydrogen phosphite)—3.99 g. (0.005 mole)
α-Methyl glucopyranoside—0.96 g. (0.005 mole)
Molar ratio—1:1
Dicyclohexylcarbodiimide—4.1 g. (0.02 mole)
$[\alpha]_D^{23°} = -4.7$
Bioassay—341 mcg./mg.
Mouse $CD_{50}$:
  IM: 20–40 mg./kg.
  Oral: 100–200 mg./kg.
Solubility, water—10%.

EXAMPLE 12

D-glucopyranose-6-[erythromycin-2'-(β-sulfopropionate)]

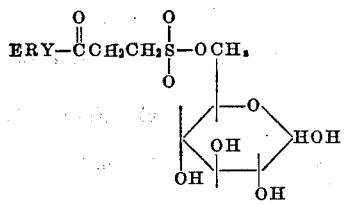

A combination of 2.18 g. (.0025 mole) of 2'-sulfopropionylerythromycin A, made by the method disclosed in U.S. Patent 2,969,352, 0.45 g. (.0025 mole) of D-glucopyranose, and 2.08 g. (.01 mole) of dicyclohexylcarbodiimide was dissolved in 50 ml. dry pyridine and stirred at room temperature for seven days. The dicyclohexylurea was filtered from solution and the filtrate evaporated to an oil. The oil was dissolved in acetone containing a minimum of pyridine to keep the product in solution. More traces of dicyclohexylurea were filtered and the acetone solution was added dropwise to 300 ml. stirring ether. The resulting precipitate was filtered and dried.

$[\alpha]_D^{25°} = -27.0$
Bioassay—443 mcg./mg.
Mouse $CD_{50}$:
  IM: >40 mg./kg.
  Oral: 50–100 mg./kg.
Solubility, water—2%.

EXAMPLE 13

Methyl-α-D-glucopyranoside-6-[erythromycin-2'-(β-sulfopropionate)]

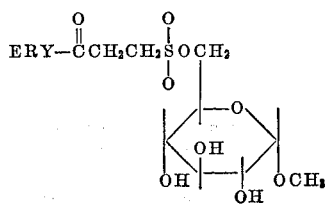

This derivative was made employing the same method as in Example 12, substituting 0.48 g. (.0025 mole) α-methylglucopyranoside for the D-glucopyranose.

$[\alpha]_D^{19°} = -8.4$
Bioassay—541 mcg./mg.
Mouse $CD_{50}$:
  IM: >40 mg./kg.
  Oral: 50–100 mg./kg.
Solubility, water—2%.

Therapeutic compositions containing the carbohydrate derivatives of the present invention and suitable for oral administration can be prepared by combining a selected derivative with a pharmaceutically-acceptable medium in a manner well known in the art. Dosage amounts generally follow the present usage of erythromycin. A pharmaceutical embodiment comprising a therapeutically-active solution of said erythromycin carbohydrate derivatives may be prepared by mixing a selected derivative with a pharmaceutically-acceptable carrier such as polyethylene glycol or water. Such a composition may be administered intramuscularly by means of a hypodermic needle in the conventional manner.

Others may practice the invention in any of the numerous ways which will be suggested by this disclosure to one skilled in the art.

What is claimed is:

1. Carbohydrate derivatives of acidic esters of erythromycin wherein the acidic ester is selected from the group consisting of the phosphate, phosphite, sulfopropionate, oxalate, malonate, succinate, glutarate, adipate, phthalate, maleate and fumarate and wherein the carbohydrate is selected from the group consisting of loweralkyl-α-D-glucoside, 2-amino-2-deoxy-D-glucose, glucose, fructose, maltose, lactose and sucrose.

2. A compound having the formula:

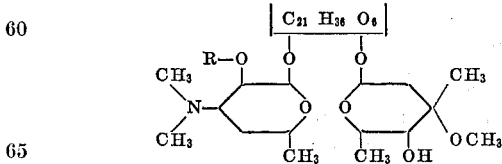

wherein R is selected from the group consisting of D-glucopyranose hydrogen phosphate, loweralkyl-α-D-glucopyranoside hydrogen phosphate, 2-amino-2-deoxy-D-glucopyranose hydrogen phosphate, sucrose hydrogen phosphate, sucrose erythromycin-2'-hydrogen phosphate, sucrose [di-(erythromycin-2'-hydrogen phosphate)], β-lactose hydrogen phosphate, β-lactose-(erythromycin-2'-hydrogen phosphate), D-glucopyranose phosphite, loweralkyl-α-D-glucopyranoside phosphite, D-glucopyranose β- sulfopropionate, and loweralkyl-α-D-glucopyranoside β-sulfopropionate.

3. A compound as claimed in claim 2 wherein R is D-glucopyranose hydrogen phosphate.

4. A compound as claimed in claim 2 wherein R is loweralkyl-α-D-glucopyranoside hydrogen phosphate.

5. A compound as claimed in claim 2 wherein R is 2-amino-2-deoxy-D-glucopyranose hydrogen phosphate.

6. A compound as claimed in claim 2 wherein R is sucrose hydrogen phosphate.

7. A compound as claimed in claim 2 wherein R is sucrose erythromycin-2′-hydrogen phosphate.

8. A compound as claimed in claim 2 wherein R is sucrose [di-(erythromycin-2′-hydrogen phosphate)].

9. A compound as claimed in claim 2 wherein R is β-lactose hydrogen phosphate.

10. A compound as claimed in claim 2 wherein R is β-lactose-(erythromycin-2′-hydrogen phosphate).

11. A compound as claimed in claim 2 wherein R is D-glucopyranose phosphite.

12. A compound as claimed in claim 2 wherein R is loweralkyl-α-D-glucopyranoside phosphite.

13. A compound as claimed in claim 2 wherein R is D-glucopyranose β-sulfopropionate.

14. A compound as claimed in claim 2 wherein R is loweralkyl-α-D-glucopyranoside-β-sulfopropionate.

References Cited

UNITED STATES PATENTS 2,852,429  9/1958  Shepler.
3,276,956  10/1966  Cardinal.

LEWIS GOTTS, Primary Examiner
JOHNNIE R. BROWN, Assistant Examiner

U.S. Cl. X.R.

424—181